(12) United States Patent
Dintenfass et al.

(10) Patent No.: US 10,810,040 B2
(45) Date of Patent: Oct. 20, 2020

(54) SYSTEM FOR REAL-TIME TRANSMISSION OF DATA ASSOCIATED WITH TRIGGER EVENTS

(71) Applicant: BANK OF AMERICA CORPORATION, Charlotte, NC (US)

(72) Inventors: Katherine Dintenfass, Lincoln, RI (US); Paul Adam Keifer, Hudsonville, MI (US); Ashwin Borges, Newark, DE (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 51 days.

(21) Appl. No.: 16/267,521

(22) Filed: Feb. 5, 2019

(65) Prior Publication Data
US 2020/0249984 A1 Aug. 6, 2020

(51) Int. Cl.
G06F 9/48 (2006.01)
H04L 29/08 (2006.01)
H04W 4/02 (2018.01)

(52) U.S. Cl.
CPC ............ *G06F 9/4843* (2013.01); *H04L 67/18* (2013.01); *H04L 67/22* (2013.01); *H04W 4/02* (2013.01)

(58) Field of Classification Search
CPC ..... H04L 67/22; G06Q 30/0261; H04W 4/02; H04W 4/021
See application file for complete search history.

(56) References Cited

U.S. PATENT DOCUMENTS

| | | | |
|---|---|---|---|
| 6,236,975 B1 | 5/2001 | Boe et al. | |
| 7,020,626 B1 | 3/2006 | Eng et al. | |
| 7,330,850 B1 | 2/2008 | Seibel et al. | |
| 7,349,881 B1 | 3/2008 | Lockwood | |
| 7,398,236 B2 | 7/2008 | Jaffe | |
| 7,447,656 B2 | 11/2008 | Parthasarathy | |
| 7,447,659 B2 | 11/2008 | Parthasarathy | |
| 7,689,507 B2 | 3/2010 | Hung et al. | |
| 7,734,641 B2 | 6/2010 | Kanigsberg et al. | |
| 7,752,102 B2 | 7/2010 | Thomas | |
| 7,792,697 B2 | 9/2010 | Bhagchandani et al. | |

(Continued)

OTHER PUBLICATIONS http://theconversation.com/when-ai-meets-your-shopping-experience-it-knows-what-you-buy-and-what-you-ought-to-buy-101737.
https://www.orpheus-it.com/big-data/artificial-intelligence-in-procurement.

*Primary Examiner* — Brian W Wathen (74) *Attorney, Agent, or Firm* — Michael A. Springs; Moore & Van Allen PLLC; Nicholas C. Russell (57) ABSTRACT

Embodiments of the present invention provide a system for real-time transmission of data associated with trigger events. The system is configured for identifying one or more priorities associated with a user, extract one or more triggers associated with the one or more priorities of the user, receiving an indication that at least one condition associated with at least one of the one or more triggers is met, determining that the user is performing one or more actions associated with at least one priority of the one or more priorities based receiving the indication, in response to determining that the user is performing the one or more actions associated with the at least one priority, dynamically extracting information associated with the user, and transmitting, in real-time, the extracted information associated with the user to at least one third party entity.

18 Claims, 5 Drawing Sheets

(56) References Cited

U.S. PATENT DOCUMENTS

| | | |
|---|---|---|
| 7,797,208 B2 | 9/2010 | Thomas |
| 7,873,569 B1 | 1/2011 | Cahn |
| 8,024,213 B1 | 9/2011 | Fano et al. |
| 8,144,007 B2 | 3/2012 | Tuck et al. |
| 8,285,622 B1 | 10/2012 | Rao et al. |
| 8,301,514 B1 | 10/2012 | Vippagunta |
| 8,417,584 B2 | 4/2013 | Ross |
| 8,473,380 B2 | 6/2013 | Thomas et al. |
| 8,478,691 B2 | 7/2013 | Solomon et al. |
| 8,571,919 B2 | 10/2013 | Rane et al. |
| 8,571,975 B1 | 10/2013 | Lehman et al. |
| 8,572,072 B1 | 10/2013 | Roumeliotis |
| 8,666,836 B2 | 3/2014 | Adams |
| 8,782,076 B2 | 7/2014 | Rothman et al. |
| 8,838,499 B2 | 9/2014 | Del Bene et al. |
| 9,256,876 B2 | 2/2016 | Vasant Akole et al. |
| 9,311,386 B1 | 4/2016 | Song et al. |
| 9,460,468 B2 | 10/2016 | Boberski et al. |
| 9,495,703 B1 | 11/2016 | Kaye, III |
| 9,672,283 B2 | 6/2017 | Pappas et al. |
| 9,710,821 B2 | 7/2017 | Heath |
| 9,767,182 B1 | 9/2017 | Thakur et al. |
| 9,875,491 B2 | 1/2018 | Weksler |
| 2008/0033852 A1 | 2/2008 | Megdal et al. |
| 2010/0145772 A1 | 6/2010 | McCauley et al. |
| 2011/0082718 A1 | 4/2011 | Ghosh et al. |
| 2011/0178848 A1 | 7/2011 | Rane et al. |
| 2012/0005053 A1 | 1/2012 | Burgess et al. |
| 2012/0133437 A1* | 5/2012 | Shionoiri ............... G11C 7/062 330/253 |
| 2013/0054314 A1 | 2/2013 | Ross et al. |
| 2013/0311326 A1 | 11/2013 | Lucas et al. |
| 2014/0025491 A1 | 1/2014 | Nagarajan et al. |
| 2014/0032294 A1* | 1/2014 | Donlan ............. G06Q 30/0224 705/14.17 |
| 2014/0095251 A1 | 4/2014 | Huovilainen |
| 2014/0279004 A1* | 9/2014 | Thomas ............. G06Q 30/0261 705/14.58 |
| 2015/0220923 A1* | 8/2015 | Vasant Akole ...... G06Q 20/405 705/44 |
| 2016/0071201 A1 | 3/2016 | Zhang et al. |
| 2016/0180465 A1 | 6/2016 | Deperro et al. |
| 2016/0371772 A1 | 12/2016 | Zuluaga Rueda et al. |
| 2017/0011444 A1 | 1/2017 | Greystoke et al. |
| 2017/0024813 A1 | 1/2017 | Crouspeyre et al. |
| 2017/0061535 A1 | 3/2017 | Williams |
| 2017/0193501 A1 | 7/2017 | Cole et al. |
| 2018/0005323 A1 | 1/2018 | Grassadonia |
| 2018/0096313 A1 | 4/2018 | Chenard et al. |
| 2018/0144412 A1 | 5/2018 | Chenard et al. |
| 2018/0189888 A1 | 7/2018 | Deperro et al. |
| 2018/0218176 A1 | 8/2018 | Voorhees et al. |
| 2018/0276710 A1 | 9/2018 | Tietzen et al. |

* cited by examiner

SYSTEM FOR REAL-TIME TRANSMISSION OF DATA ASSOCIATED WITH TRIGGER EVENTS

BACKGROUND

Present conventional systems do not have the capability to identify that a user is performing one or more actions associated with a priority and transmit data associated with the user in real-time to at least one third party entity in order to improve the efficiency of the process. As such, there exists a need for a system for efficiently transmitting data associated with trigger events in real-time.

BRIEF SUMMARY

The following presents a summary of certain embodiments of the invention. This summary is not intended to identify key or critical elements of all embodiments nor delineate the scope of any or all embodiments. Its sole purpose is to present certain concepts and elements of one or more embodiments in a summary form as a prelude to the more detailed description that follows.

Embodiments of the present invention address the above needs and/or achieve other advantages by providing apparatuses (e.g., a system, computer program product and/or other devices) and methods for creating and managing self-purgative electronic resources. The system embodiments may comprise one or more memory devices having computer readable program code stored thereon, a communication device, and one or more processing devices operatively coupled to the one or more memory devices, wherein the one or more processing devices are configured to execute the computer readable program code to carry out the invention. In computer program product embodiments of the invention, the computer program product comprises at least one non-transitory computer readable medium comprising computer readable instructions for carrying out the invention. Computer implemented method embodiments of the invention may comprise providing a computing system comprising a computer processing device and a non-transitory computer readable medium, where the computer readable medium comprises configured computer program instruction code, such that when said instruction code is operated by said computer processing device, said computer processing device performs certain operations to carry out the invention.

In some embodiments, the present invention identifies one or more priorities associated with a user, extracts one or more triggers associated with the one or more priorities of the user, receives an indication that at least one condition associated with at least one of the one or more triggers is met, determines that the user is performing one or more actions associated with at least one priority of the one or more priorities based receiving the indication, in response to determining that the user is performing the one or more actions associated with the at least one priority, dynamically extracts information associated with the user, and transmits, in real-time, the extracted information associated with the user to at least one third party entity.

In some embodiments, the present invention continuously monitors a real-time location of the user and identifies that the real-time location of the user matches a location of the at least one third party entity.

In some embodiments, the present invention transmits the extracted information associated with the user to at least one third party entity based on determining that the real-time location of the user matches the location of the at least one third party entity after a predetermined amount of time.

In some embodiments, the present invention receives the indication from a user device of the user.

In some embodiments, the present invention extracts the information associated with the user comprises accessing one or more resource pools of the user, extracting resource pool data associated with the one or more resource pools of the user, accessing one or more applications associated with the user, and extracting application data associated with the user.

In some embodiments, the present invention transmits the extracted information associated with the user to at least one third party entity based on prompting the user on a user device of the user to provide consent to transmit the information to the at least one third party entity and receiving the consent from the user.

In some embodiments, the present invention calculates a resource limit associated with the at least one priority and transmits the resource limit to the at least one third party entity.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Having thus described embodiments of the invention in general terms, reference will now be made the accompanying drawings, wherein:

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

In accordance with embodiments of the invention, the terms "entity" may include any organization that processes financial transactions including, but not limited to, banks, credit unions, savings and loan associations, investment companies, stock brokerages, resource management firms, insurance companies and the like. In accordance with embodiments of the invention, the terms "third party system" and "other third party systems" may include any organizations including, but not limited to, photo identification issuing agencies, network managing organizations, email managing organizations, and/or the like. Furthermore, embodiments of the present invention use the term "user" or "customer." It will be appreciated by someone with ordinary skill in the art that the user or customer may be a customer of the financial institution or a potential customer of the financial institution or an employee of the financial institution.

In accordance with embodiments of the invention, a "resource pool" or an "account" is the relationship that a customer has with an entity, such as a financial institution. Examples of accounts include a deposit account, such as a transactional account (e.g., a banking account), a savings account, an investment account, a money market account, a time deposit, a demand deposit, a pre-paid account, a credit account, a debit/deposit account, a non-monetary user information that includes information associated with the user, or the like. The account is associated with and/or maintained by the entity.

In accordance with embodiments of the invention, a "resource interaction" may be a transaction, transfer of funds, transfer of resources, and may refer to any activities or communication between a user and an entity, between an entity and a third party system, activities or communication between multiple entities, communication between technology application and the like. Transfer of resources may refer to a payment, processing of funds, international transfer of funds, purchase of goods or services, a return of goods or services, a payment transaction, a credit transaction, or other interactions involving user's resource or account.

Many of the example embodiments and implementations described herein contemplate interactions engaged in by a user with a computing device and/or one or more communication devices and/or secondary communication devices. A "user", as referenced herein, may refer to an entity or individual that has the ability and/or authorization to access and use one or more resources or portions of a resource. Furthermore, as used herein, the term "user computing device" or "mobile device" may refer to mobile phones, computing devices, tablet computers, wearable devices, smart devices and/or any portable electronic device capable of receiving and/or storing data therein.

A "user interface" is any device or software that allows a user to input information, such as commands or data, into a device, or that allows the device to output information to the user. For example, the user interface include a graphical user interface (GUI) or an interface to input computer-executable instructions that direct a processing device to carry out specific functions. The user interface typically employs certain input and output devices to input data received from a user second user or output data to a user. These input and output devices may include a display, mouse, keyboard, button, touchpad, touch screen, microphone, speaker, LED, light, joystick, switch, buzzer, bell, and/or other user input/output device for communicating with one or more users.

In accordance with embodiments of the invention, a "life plan" may include one or more life events and/or life priorities associated with a user. One or more life events may include "job change," "marriage/divorce," "welcome a child," "buy/sell home," "upcoming travel," "retirement," "end of life," and/or the like. One or more life priorities may include "Home," "Finance," "Health," "Giving," "Leisure," "Family," "Work," and/or the like.

Typically, present conventional systems do not have the capability to identify that a user is performing one or more actions associated with a priority and transmit data associated with the user to at least one third entity associated with the priority. As such, there exists a need for a system to transmit data in real-time to the at least one third party entity to improve the speed and efficiency of the process. The system of the present invention addresses the above issue by monitoring the activity of the user to identify whether the user is performing any actions associated with a priority and transmits, in real-time, data associated with the user to a third party entity associated with the priority in order to improve the efficiency of the process of fulfilling a priority.

Figure 1:
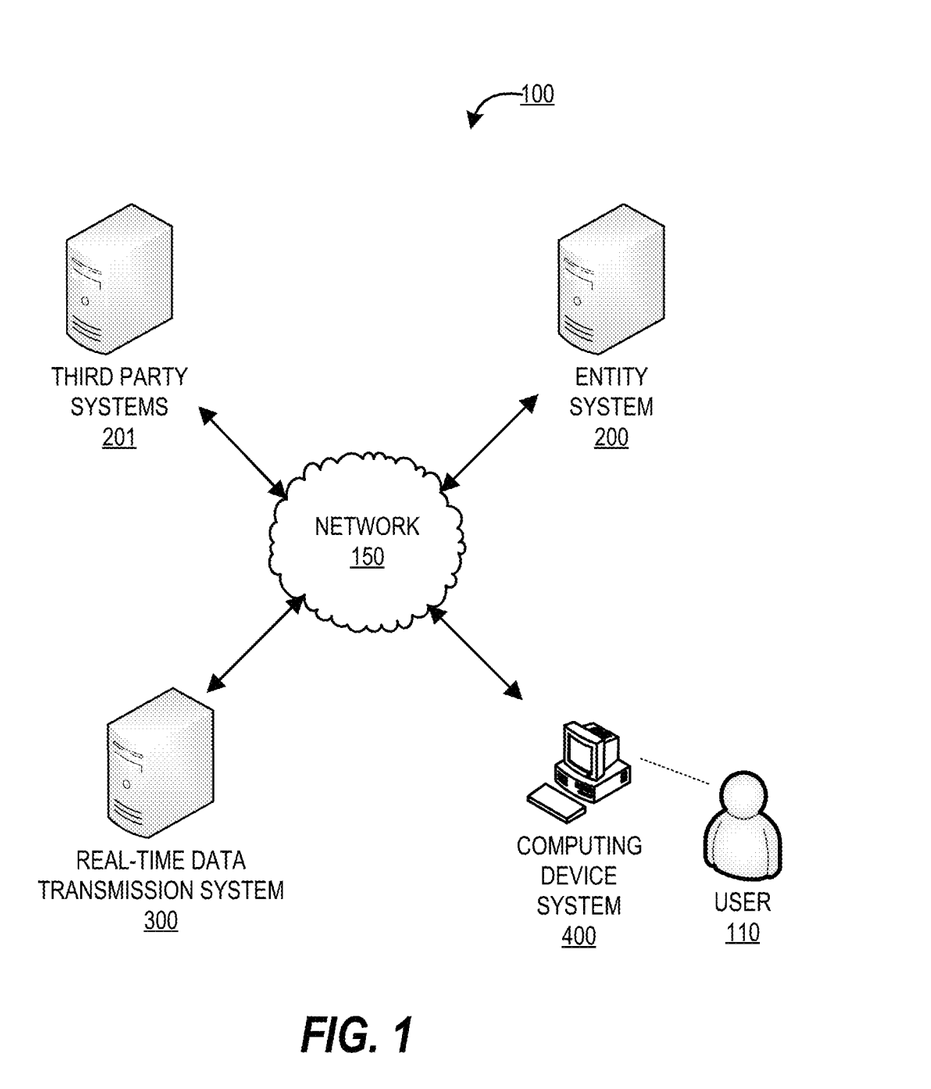
FIG. 1 provides a block diagram illustrating a system environment for transmitting real-time data associated with trigger events, in accordance with an embodiment of the invention.

FIG. 1 provides a block diagram illustrating a system environment 100 for navigating utilization of resources, in accordance with an embodiment of the invention. As illustrated in FIG. 1, the environment 100 includes a real-time data transmission system 300, entity system 200, a computing device system 400, and one or more third party systems 201. One or more users 110 may be included in the system environment 100, where the users 110 interact with the other entities of the system environment 100 via a user interface of the computing device system 400. In some embodiments, the one or more user(s) 110 of the system environment 100 may be customers of an entity associated with the entity system 200.

The entity system(s) 200 may be any system owned or otherwise controlled by an entity to support or perform one or more process steps described herein. The entity may be any organization which develops or manages applications. In some embodiments, the managing entity is a financial institution. In some embodiments, the managing entity is a non-financial institution.

The real-time data transmission system 300 is a system of the present invention for performing one or more process steps described herein. In some embodiments, the real-time data transmission system 300 may be an independent system. In some embodiments, the real-time data transmission system 300 may be a part of the entity system 200.

The real-time data transmission system 300, the entity system 200, the computing device system 400, and/or the third party systems 201 may be in network communication across the system environment 100 through the network 150. The network 150 may include a local area network (LAN), a wide area network (WAN), and/or a global area network (GAN). The network 150 may provide for wireline, wireless, or a combination of wireline and wireless communication between devices in the network. In one embodiment, the network 150 includes the Internet. In general, the real-time data transmission system 300 is configured to communicate information or instructions with the entity system 200, the computing device system 400, and/or the third party systems 201 across the network 150.

The computing device system 400 may be a system owned or controlled by the entity of the entity system 200, the user 110, and/or a third party that specializes in processing of the resource distribution applications in the system environment 100. As such, the computing device system 400 may be a computing device of the user 110. In general, the computing device system 400 communicates with the user 110 via a user interface of the computing device system 400, and in turn is configured to communicate information or instructions with the real-time data transmission system 300, entity system 200, and/or the third party systems 201 across the network 150.

Figure 2:
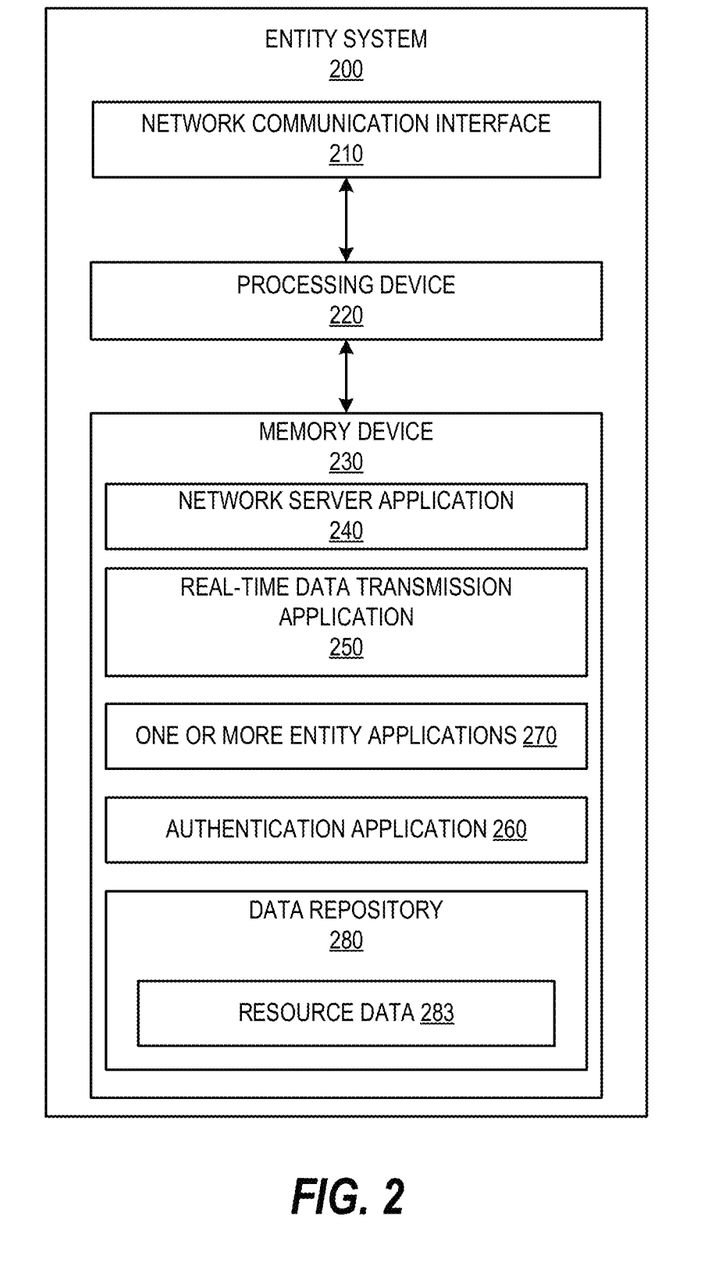
FIG. 2 provides a block diagram illustrating the entity system 200 of FIG. 1, in accordance with an embodiment of the invention.

FIG. 2 provides a block diagram illustrating the entity system 200, in greater detail, in accordance with embodiments of the invention. As illustrated in FIG. 2, in one embodiment of the invention, the entity system 200 includes one or more processing devices 220 operatively coupled to a network communication interface 210 and a memory device 230. In certain embodiments, the entity system 200 is operated by a first entity, such as a financial institution, while in other embodiments, the entity system 200 is operated by an entity other than a financial institution.

It should be understood that the memory device 230 may include one or more databases or other data structures/repositories. The memory device 230 also includes computer-executable program code that instructs the processing device 220 to operate the network communication interface 210 to perform certain communication functions of the entity system 200 described herein. For example, in one embodiment of the entity system 200, the memory device 230 includes, but is not limited to, a network server application 240, a real-time data transmission application 250, one or more entity applications 270, an authentication application 260, and a data repository 280 comprising resource data 283 and user data (not shown). The computer-executable program code of the network server application 240, the real-time data transmission application 250, the one or more entity applications 270, and the authentication application 260 to perform certain logic, data-extraction, and data-storing functions of the entity system 200 described herein, as well as communication functions of the entity system 200.

The network server application 240, the real-time data transmission application 250, the one or more entity applications 270, and the authentication application 260 are configured to store data in the data repository 280 or to use the data stored in the data repository 280 when communicating through the network communication interface 210 with the real-time data transmission system 300, the computing device system 400, and/or the third party systems 201 to perform one or more process steps described herein. In some embodiments, the entity system 200 may receive instructions from the real-time data transmission system 300 via the real-time data transmission application 250 to perform certain operations. The real-time data transmission application 250 may be provided by the real-time data transmission system 300. The one or more entity applications 270 may be any of the applications used, created, modified, and/or managed by the entity system 200. The authentication application 260 may be used to authenticate one or more users 110 to access the one or more entity applications 270 and the data repository 280.

Figure 3:
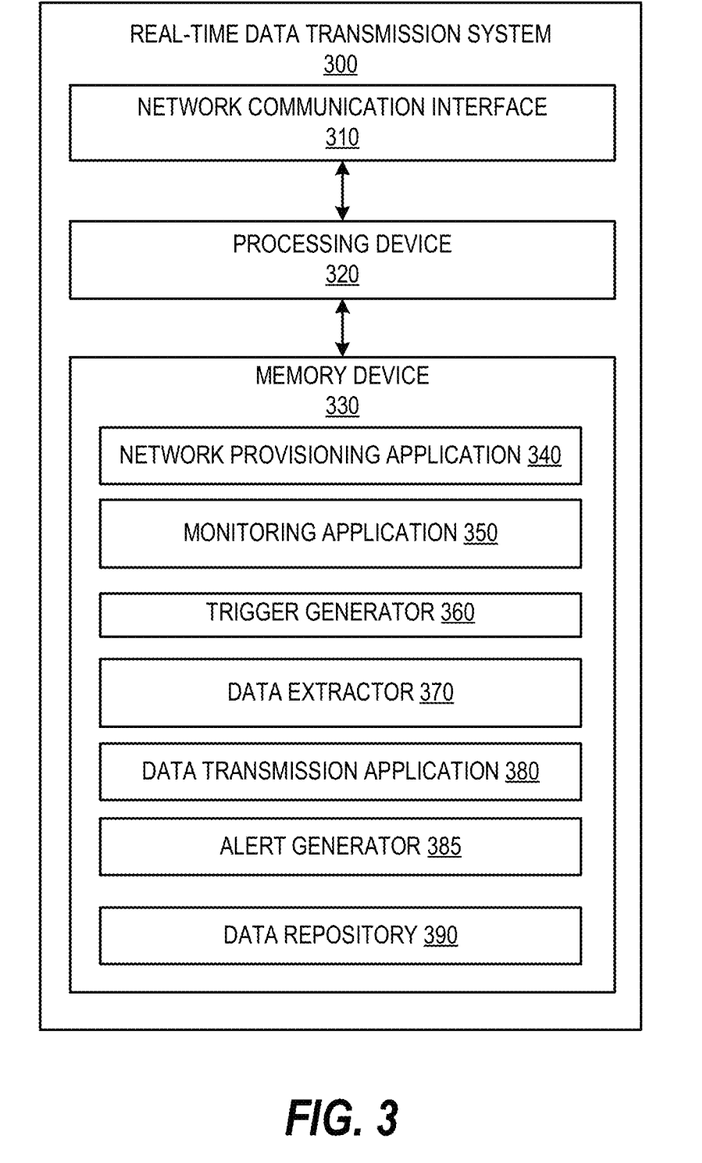
FIG. 3 provides a block diagram illustrating a real-time data transmission system 300 of FIG. 1, in accordance with an embodiment of the invention.

FIG. 3 provides a block diagram illustrating the real-time data transmission system 300 in greater detail, in accordance with embodiments of the invention. As illustrated in FIG. 3, in one embodiment of the invention, the real-time data transmission system 300 includes one or more processing devices 320 operatively coupled to a network communication interface 310 and a memory device 330. In certain embodiments, the real-time data transmission system 300 is operated by a first entity, such as a financial institution, while in other embodiments, the real-time data transmission system 300 is operated by an entity other than a financial institution. In some embodiments, the real-time data transmission system 300 is owned or operated by the entity of the entity system 200. In some embodiments, the real-time data transmission system 300 may be an independent system. In alternate embodiments, the real-time data transmission system 300 may be a part of the entity system 200.

It should be understood that the memory device 330 may include one or more databases or other data structures/repositories. The memory device 330 also includes computer-executable program code that instructs the processing device 320 to operate the network communication interface 310 to perform certain communication functions of the real-time data transmission system 300 described herein. For example, in one embodiment of the real-time data transmission system 300, the memory device 330 includes, but is not limited to, a network provisioning application 340, a monitoring application 350, a trigger application 360, a data extractor 370, data transmission application 380, an alert generator 385, and a data repository 390 comprising data processed or accessed by one or more applications in the memory device 330. The computer-executable program code of the network provisioning application 340, the monitoring application 350, the trigger application 360, the data extractor 370, the data transmission application 380, and the alert generator 385 may instruct the processing device 320 to perform certain logic, data-processing, and data-storing functions of the real-time data transmission system 300 described herein, as well as communication functions of the real-time data transmission system 300.

The network provisioning application 340, the monitoring application 350, the trigger application 360, the data extractor 370, the data transmission application 380, and the alert generator 385 are configured to invoke or use the data in the data repository 390 when communicating through the network communication interface 310 with the entity system 200, the computing device system 400, and/or the third party systems 201. In some embodiments, the network provisioning application 340, network provisioning application 340 the monitoring application 350, the trigger application 360, the data extractor 370, the data transmission application 380, and the alert generator 385 may store the data extracted or received from the entity system 200, the third party system 201, and the computing device system 400 in the data repository 390. In some embodiments, the network provisioning application 340, network provisioning application 340, the monitoring application 350, the trigger application 360, the data extractor 370, the data transmission application 380, and the alert generator 385 may be a part of a single application.

The monitoring application 350 monitors user activities and the trigger application 360 identifies that a condition associated with a trigger has been met based on the data provided by the monitoring application. In response to identifying a trigger, the data extractor extracts real-time data associated with the user from the computing device system 400, the entity system 200, and/or the third party systems. The data transmission application 380 may transmit the extracted data to a third party entity system. The alert generator 385 may send alerts to the user that the system is sharing the user data with the third party system.

Figure 4:
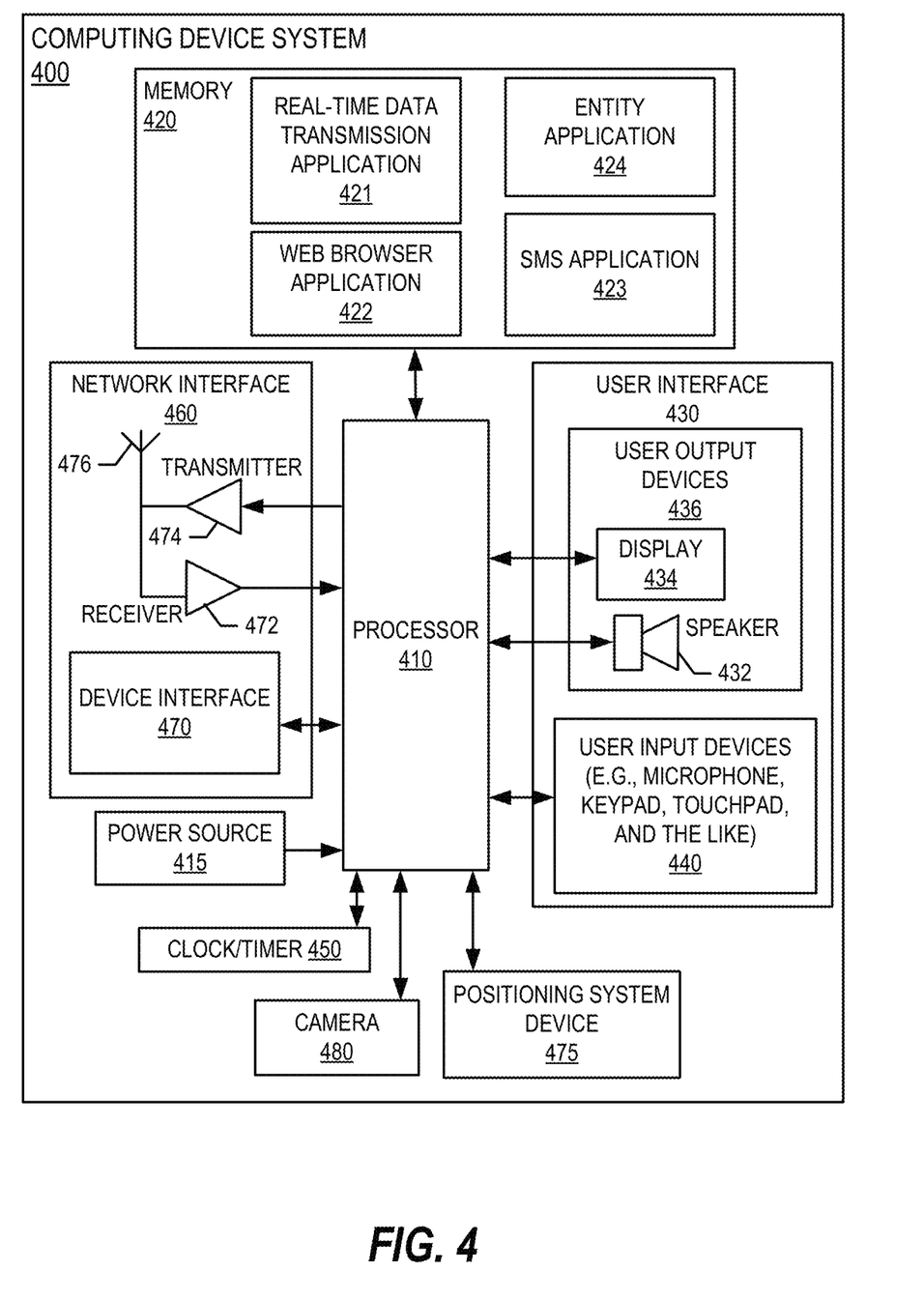
FIG. 4 provides a block diagram illustrating the computing device system 400 of FIG. 1, in accordance with an embodiment of the invention.

FIG. 4 provides a block diagram illustrating a computing device system 400 of FIG. 1 in more detail, in accordance with embodiments of the invention. However, it should be understood that a mobile telephone is merely illustrative of one type of computing device system 400 that may benefit from, employ, or otherwise be involved with embodiments of the present invention and, therefore, should not be taken to limit the scope of embodiments of the present invention. Other types of computing devices may include portable digital assistants (PDAs), pagers, mobile televisions, gaming devices, desktop computers, workstations, laptop computers, cameras, video recorders, audio/video player, radio, GPS devices, wearable devices, Internet-of-things devices, augmented reality devices, virtual reality devices, automated teller machine devices, electronic kiosk devices, or any combination of the aforementioned.

Some embodiments of the computing device system 400 include a processor 410 communicably coupled to such devices as a memory 420, user output devices 436, user input devices 440, a network interface 460, a power source 415, a clock or other timer 450, a camera 480, and a positioning system device 475. The processor 410, and other processors described herein, generally include circuitry for implementing communication and/or logic functions of the computing device system 400. For example, the processor 410 may include a digital signal processor device, a microprocessor device, and various analog to digital converters, digital to analog converters, and/or other support circuits. Control and signal processing functions of the computing device system 400 are allocated between these devices according to their respective capabilities. The processor 410 thus may also include the functionality to encode and interleave messages and data prior to modulation and transmission. The processor 410 can additionally include an internal data modem. Further, the processor 410 may include functionality to operate one or more software programs, which may be stored in the memory 420. For example, the processor 410 may be capable of operating a connectivity program, such as a web browser application 422. The web browser application 422 may then allow the computing device system 400 to transmit and receive web content, such as, for example, location-based content and/or other web page content, according to a Wireless Application Protocol (WAP), Hypertext Transfer Protocol (HTTP), and/or the like.

The processor 410 is configured to use the network interface 460 to communicate with one or more other devices on the network 150. In this regard, the network interface 460 includes an antenna 476 operatively coupled to a transmitter 474 and a receiver 472 (together a "transceiver"). The processor 410 is configured to provide signals to and receive signals from the transmitter 474 and receiver 472, respectively. The signals may include signaling information in accordance with the air interface standard of the applicable cellular system of the wireless network 152. In this regard, the computing device system 400 may be configured to operate with one or more air interface standards, communication protocols, modulation types, and access types. By way of illustration, the computing device system 400 may be configured to operate in accordance with any of a number of first, second, third, and/or fourth-generation communication protocols and/or the like. For example, the computing device system 400 may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols, with LTE protocols, with 4GPP protocols and/or the like. The computing device system 400 may also be configured to operate in accordance with non-cellular communication mechanisms, such as via a wireless local area network (WLAN) or other communication/data networks.

As described above, the computing device system 400 has a user interface that is, like other user interfaces described herein, made up of user output devices 436 and/or user input devices 440. The user output devices 436 include a display 430 (e.g., a liquid crystal display or the like) and a speaker 432 or other audio device, which are operatively coupled to the processor 410.

The user input devices 440, which allow the computing device system 400 to receive data from a user such as the user 110, may include any of a number of devices allowing the computing device system 400 to receive data from the user 110, such as a keypad, keyboard, touch-screen, touch-pad, microphone, mouse, joystick, other pointer device, button, soft key, and/or other input device(s). The user interface may also include a camera 480, such as a digital camera.

The computing device system 400 may also include a positioning system device 475 that is configured to be used by a positioning system to determine a location of the computing device system 400. For example, the positioning system device 475 may include a GPS transceiver. In some embodiments, the positioning system device 475 is at least partially made up of the antenna 476, transmitter 474, and receiver 472 described above. For example, in one embodiment, triangulation of cellular signals may be used to identify the approximate or exact geographical location of the computing device system 400. In other embodiments, the positioning system device 475 includes a proximity sensor or transmitter, such as an RFID tag, that can sense or be sensed by devices known to be located proximate a merchant or other location to determine that the computing device system 400 is located proximate these known devices.

The computing device system 400 further includes a power source 415, such as a battery, for powering various circuits and other devices that are used to operate the computing device system 400. Embodiments of the computing device system 400 may also include a clock or other timer 450 configured to determine and, in some cases, communicate actual or relative time to the processor 410 or one or more other devices.

The computing device system 400 also includes a memory 420 operatively coupled to the processor 410. As used herein, memory includes any computer readable medium (as defined herein below) configured to store data, code, or other information. The memory 420 may include volatile memory, such as volatile Random Access Memory (RAM) including a cache area for the temporary storage of data. The memory 420 may also include non-volatile memory, which can be embedded and/or may be removable. The non-volatile memory can additionally or alternatively include an electrically erasable programmable read-only memory (EEPROM), flash memory or the like.

The memory 420 can store any of a number of applications which comprise computer-executable instructions/code executed by the processor 410 to implement the functions of the computing device system 400 and/or one or more of the process/method steps described herein. For example, the memory 420 may include such applications as a conventional web browser application 422, a real-time data transmission application 421, entity application 424. These applications also typically instructions to a graphical user interface (GUI) on the display 430 that allows the user 110 to interact with the entity system 200, the real-time data transmission system 300, and/or other devices or systems. The memory 420 of the computing device system 400 may comprise a Short Message Service (SMS) application 423 configured to send, receive, and store data, information, communications, alerts, and the like via the wireless telephone network 152. In some embodiments, the real-time data transmission application 421 provided by the real-time data transmission system 300 allows the user 110 to access the one or more electronic resources stored in the entity system and/or the real-time data transmission system 300. In some embodiments, the entity application 424 provided by the entity system 200 and the real-time data transmission application 421 allow the user 110 to access one or more electronic resources and one or more entity applications 270.

The memory 420 can also store any of a number of pieces of information, and data, used by the computing device system 400 and the applications and devices that make up the computing device system 400 or are in communication with the computing device system 400 to implement the functions of the computing device system 400 and/or the other systems described herein.

Figure 5:
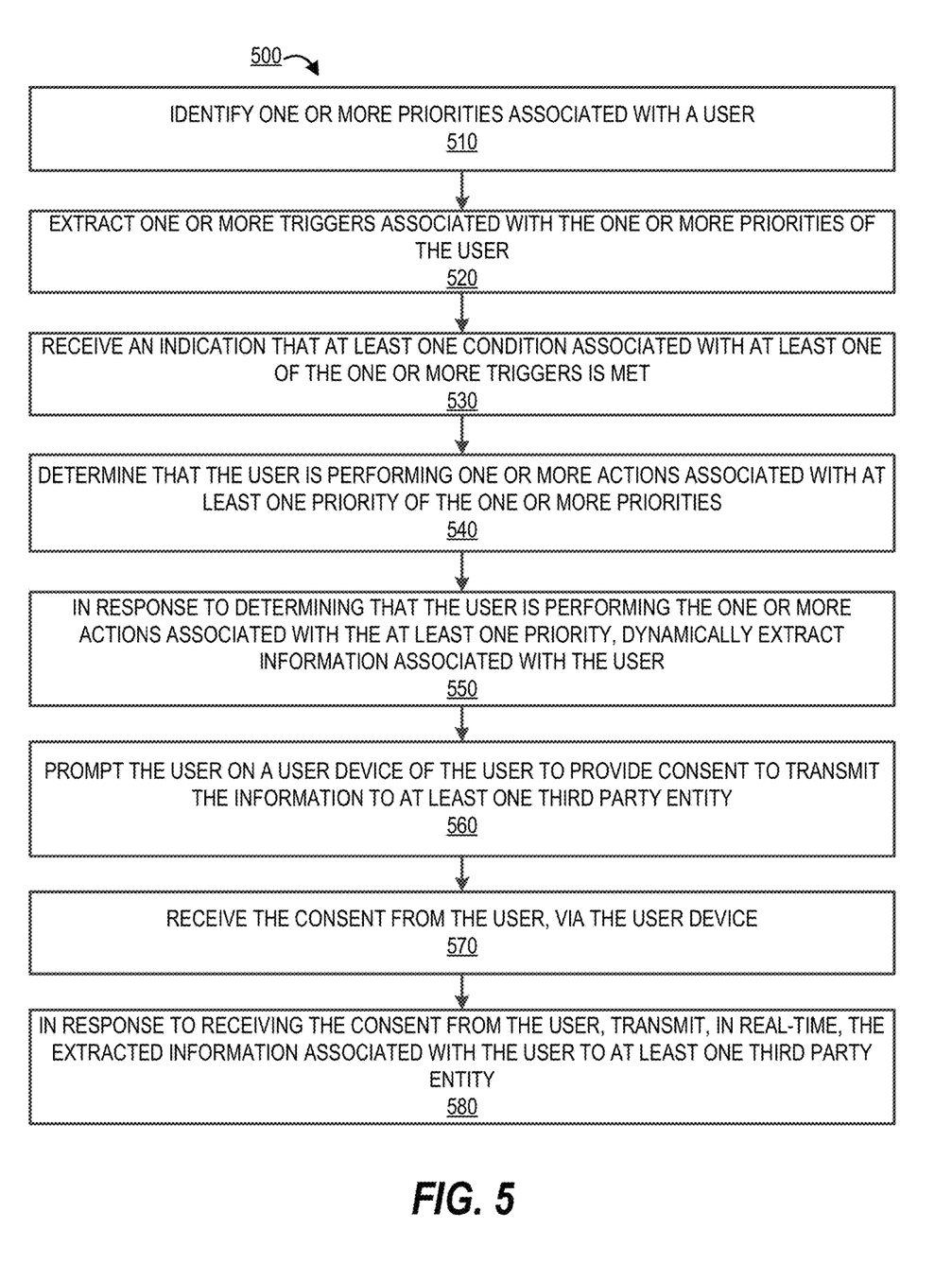
FIG. 5 provides a flowchart illustrating a process flow for transmitting real-time data associated with trigger events, in accordance with an embodiment of the invention.

FIG. 5 provides a flowchart illustrating a process flow for transmitting real-time data associated with trigger events, in accordance with an embodiment of the invention. As shown in block 510, the system identifies one or more priorities associated with a user. The one or more priorities may comprise "Home," "Finance," "Health," "Giving," "Leisure," "Family," "Work," "travel," "car," and/or the like. In some embodiments, the system may prompt the user periodically to identify one or more priorities, via a user interface of an entity application (e.g., online banking application, or the like) and based on the response received from the user, the system may identify the one or more priorities and the one or more events. In some embodiments, the system may identify the one or more priorities and the one or more events based on the conversations with an associate (e.g., customer care representative, financial analyst, or the like) of the entity. In some embodiments, the system may automatically identify one or priorities based on monitoring one or more resource interactions associated with one or more resource pools of the user. For example, the system may identify that the user is depositing some amount into the savings account every month. In such an embodiment, the system may prompt the user to identify what the user is savings towards. In some embodiments, may automatically identify one or priorities based on resource interaction data and application level data of the user. For example, the system may identify that the user is depositing some amount into the savings account every month and may identify that the user is searching for various cars via a web browser application and may identify that the user is saving towards "car" priority.

As shown in block 520, the system extracts one or more triggers associated with the one or more priorities of the user. One or more triggers may include one or more conditions, one or more lists, or the like that indicate that the user is acting on the one or more priorities. For example, the system may identify that the user is acting on a priority if any of the items on a checklist are fulfilled. In some embodiments, the system may automatically create a list of triggers based on identifying one or more priorities associated with a user. In an embodiment, where the user submits one or more priorities to the system, in response to receiving the one or more priorities, the system may further prompt the user to provide one or more triggers associated with the one or more events.

As shown in block 530, the system receives an indication that at least one condition associated with at least one of the one or more triggers is met. In some embodiments, the system receives an indication from a user device of the user. In some embodiments, the system may receive an indication from a third party system. In some embodiments, the system may receive an indication from the entity system installed on the user device of the user. In some embodiments, the system establishes a real-time communication link with the user device and automatically identifies that at least one condition associated with at least one of the one or more triggers has been met. For example, the system may monitor the real-time location of the user, via a GPS feature of the user device and may identify that the real-time location of the user matches a location of the at least one third party entity, wherein the location matching may be defined as a trigger by the system or the user as explained in block 520. The third party entity may be any merchant or entity that provides services and/or goods related to the one or more priorities. For example, the system may identify that the user is saving towards "car" priority and may identify all car dealers as possible third party entities.

As shown in block 540, the system determines that the user is performing one or more actions associated with at least one priority of the one or more priorities based on receiving the indication that at least one condition associated with at least one of the one or more triggers is met. The system may identify that the real-time location of the user matches the location of the at least one third party entity and the real-time location of the user does not change for a predetermined amount of time, the system may determine that the user is performing one or more actions associated with the at least one priority.

As shown in block 550, the system in response to determining that the user is performing the one or more actions associated with the at least one priority, dynamically extracts information associated with the user. The user information may include resource information, application level data, priorities associated with the user, and/the like. For example, the user information may include transaction data, resource score, likes and dislikes of the user based on the application level data.

As shown in block 560, the system prompts the user on a user device of the user to provide consent to transmit the information to at least one third party entity. In some embodiments, the system may send the prompt in the form of a text message. In some embodiments, the system may send the prompt via the entity application. As shown in block 570, the system receives the consent from the user, via the user device As shown in block 580, the system in response to receiving the consent from the user, transmit, in real-time, the extracted information associated with the user to at least one third party entity. In some embodiments, the system may transmit the extracted information in real-time to the at least one third party in one or more levels at different time intervals. For example, if the real-time location of the user matches the location of the at least one third party entity for first predetermined amount of time, the system may transmit a first level of information such as basic user information (e.g., likes, dislikes, or the like). In another example, the system may transmit second level of information (e.g., credit reports, or the like) based on determining that the real-time location of the user matches the location of the at least one third party entity for a second predetermined amount of time. The system may transmit the extracted information in real-time to the at least one third party by establishing a real-time communication link with a third party entity system.

Once the system identifies that a purchase at the third party has been made, the system may coordinate and push out related or add on products based on the purchase of the priority product. This may include insurances, accessories, add-on products, and the like associated with the product of the priority that may have been purchased by the third party.

As will be appreciated by one of skill in the art, the present invention may be embodied as a method (including, for example, a computer-implemented process, a business process, and/or any other process), apparatus (including, for example, a system, machine, device, computer program product, and/or the like), or a combination of the foregoing. Accordingly, embodiments of the present invention may take the form of an entirely hardware embodiment, an entirely software embodiment (including firmware, resident software, micro-code, and the like), or an embodiment combining software and hardware aspects that may generally be referred to herein as a "system." Furthermore, embodiments of the present invention may take the form of a computer program product on a computer-readable medium having computer-executable program code embodied in the medium.

Any suitable transitory or non-transitory computer readable medium may be utilized. The computer readable medium may be, for example but not limited to, an electronic, magnetic, optical, electromagnetic, infrared, or semiconductor system, apparatus, or device. More specific examples of the computer readable medium include, but are not limited to, the following: an electrical connection having one or more wires; a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device.

In the context of this document, a computer readable medium may be any medium that can contain, store, communicate, or transport the program for use by or in connection with the instruction execution system, apparatus, or device. The computer usable program code may be transmitted using any appropriate medium, including but not limited to the Internet, wireline, optical fiber cable, radio frequency (RF) signals, or other mediums.

Computer-executable program code for carrying out operations of embodiments of the present invention may be written in an object oriented, scripted or unscripted programming language such as Java, Perl, Smalltalk, C++, or the like. However, the computer program code for carrying out operations of embodiments of the present invention may also be written in conventional procedural programming languages, such as the "C" programming language or similar programming languages.

Embodiments of the present invention are described above with reference to flowchart illustrations and/or block diagrams of methods, apparatus (systems), and computer program products. It will be understood that each block of the flowchart illustrations and/or block diagrams, and/or combinations of blocks in the flowchart illustrations and/or block diagrams, can be implemented by computer-executable program code portions. These computer-executable program code portions may be provided to a processor of a general purpose computer, special purpose computer, or other programmable data processing apparatus to produce a particular machine, such that the code portions, which execute via the processor of the computer or other programmable data processing apparatus, create mechanisms for implementing the functions/acts specified in the flowchart and/or block diagram block or blocks.

These computer-executable program code portions may also be stored in a computer-readable memory that can direct a computer or other programmable data processing apparatus to function in a particular manner, such that the code portions stored in the computer readable memory produce an article of manufacture including instruction mechanisms which implement the function/act specified in the flowchart and/or block diagram block(s).

The computer-executable program code may also be loaded onto a computer or other programmable data processing apparatus to cause a series of operational steps to be performed on the computer or other programmable apparatus to produce a computer-implemented process such that the code portions which execute on the computer or other programmable apparatus provide steps for implementing the functions/acts specified in the flowchart and/or block diagram block(s). Alternatively, computer program implemented steps or acts may be combined with operator or human implemented steps or acts in order to carry out an embodiment of the invention.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

To supplement the present disclosure, this application further incorporates entirely by reference the following commonly assigned patent applications:

| Docket Number | U.S. Patent Application Ser. No. | Title | Filed On |
|---|---|---|---|
| 8811US1.014033.3371 | 16/267,518 | SYSTEM FOR ASSESSING AND PRIORITIZING REAL TIME RESOUCE REQUIREMENTS | Concurrently herewith |
| 8812US1.014033.3372 | 16/267,519 | SYSTEM FOR RESOURCE REQUIREMENTS AGGREGATION AND CATEGORIZATION | Concurrently herewith |
| 8817US1.014033.3373 | 16/268,062 | SYSTEM FOR SMART CONTRACT DEPENDENT RESOURCE TRANSFER | Concurrently herewith |
| 8813US1.014033.3378 | 16/267,730 | SYSTEM FOR REAL TIME PROVISIONING OF RESOURCES BASED ON CONDITION MONITORING | Concurrently herewith |
| 8816US1.014033.3380 | 16/267,745 | NAVIGATION SYSTEM FOR MANAGING UTILIZATION OF RESOURCES | Concurrently herewith |

The invention claimed is:

1. A system for real-time transmission of data associated with trigger events, the system comprising:
   at least one non-transitory storage device; and
   at least one processing device coupled to the at least one non-transitory storage device, wherein the at least one processing device is configured to:
   identify one or more priorities associated with a user;
   extract one or more triggers associated with the one or more priorities of the user;
   receive an indication that at least one condition associated with at least one of the one or more triggers is met:
      continuously monitoring a real-time location of the user; and
      identifying that the real-time location of the user matches a location of at least one third party entity;
   determine that the user is performing one or more actions associated with at least one priority of the one or more priorities based on receiving the indication;
   in response to determining that the user is performing the one or more actions associated with the at least one priority, dynamically extract information associated with the user; and
   transmit, in real-time, the extracted information associated with the user to the at least one third party entity based on determining that the real-time location of the user matches the location of the at least one third party entity after a predetermined amount of time.

2. The system of claim 1, wherein the at least one processing device is further configured to receive the indication from a user device of the user.

3. The system of claim 1, wherein extracting the information associated with the user comprises:
   accessing one or more resource pools of the user;
   extracting resource pool data associated with the one or more resource pools of the user;
   accessing one or more applications associated with the user; and
   extracting application data associated with the user.

4. The system of claim 1, wherein the at least one processing device is further configured to transmit the extracted information associated with the user to the at least one third party entity based on:
   prompting the user on a user device of the user to provide consent to transmit the information to the at least one third party entity; and
   receiving the consent from the user.

5. The system of claim 1, wherein the at least one processing device is further configured to:
   calculate a resource limit associated with the at least one priority; and
   transmit the resource limit to the at least one third party entity.

6. The system of claim 1, wherein the at least one processing device is further configured to identify the one or more priorities associated with the user based on at least one of:
   one or more conversations associated with an associate;
   one or more inputs received from the user; and
   one or more resource interactions associated with one or more resource pools of the user.

7. A computer program product for real-time transmission of data associated with trigger events, the computer program product comprising a non-transitory computer-readable storage medium having computer executable instructions for causing a computer processor to perform the steps of:
   identifying one or more priorities associated with a user;
   extracting one or more triggers associated with the one or more priorities of the user;
   receiving an indication that at least one condition associated with at least one of the one or more triggers is met based on:
      continuously monitoring a real-time location of the user; and
      identifying that the real-time location of the user matches a location of at least one third party entity;
   determining that the user is performing one or more actions associated with at least one priority of the one or more priorities based on receiving the indication;

in response to determining that the user is performing the one or more actions associated with the at least one priority, dynamically extracting information associated with the user; and transmitting, in real-time, the extracted information associated with the user to the at least one third party entity based on determining that the real-time location of the user matches the location of the at least one third party entity after a predetermined amount of time.

8. The computer program product of claim 7, wherein the computer executable instructions cause the computer processor to receive the indication from a user device of the user.

9. The computer program product of claim 7, wherein the computer executable instructions cause the computer processor to extracting the information associated with the user based on:
   accessing one or more resource pools of the user;
   extracting resource pool data associated with the one or more resource pools of the user;
   accessing one or more applications associated with the user; and
   extracting application data associated with the user.

10. The computer program product of claim 7, wherein the computer executable instructions cause the computer processor to transmit the extracted information associated with the user to the at least one third party entity based on:
    prompting the user on a user device of the user to provide consent to transmit the information to the at least one third party entity; and
    receiving the consent from the user.

11. The computer program product of claim 7, wherein the computer executable instructions further cause the computer processor to:
    calculate a resource limit associated with the at least one priority; and
    transmit the resource limit to the at least one third party entity.

12. The computer program product of claim 7, wherein the computer executable instructions cause the computer processor to identify the one or more priorities associated with the user based on at least one of:
    one or more conversations associated with an associate;
    one or more inputs received from the user; and
    one or more resource interactions associated with one or more resource pools of the user.

13. A computerized method for real-time transmission of data associated with trigger events, the method comprising:
    identifying one or more priorities associated with a user;
    extracting one or more triggers associated with the one or more priorities of the user;
    receiving an indication that at least one condition associated with at least one of the one or more triggers is met based on:
        continuously monitoring a real-time location of the user; and
        identifying that the real-time location of the user matches a location of at least one third party entity;
    determining that the user is performing one or more actions associated with at least one priority of the one or more priorities based on receiving the indication;
    in response to determining that the user is performing the one or more actions associated with the at least one priority, dynamically extracting information associated with the user; and
    transmitting, in real-time, the extracted information associated with the user to the at least one third party entity based on determining that the real-time location of the user matches the location of the at least one third party entity after a predetermined amount of time.

14. The computerized method of claim 13, wherein extracting the information associated with the user comprises:
    accessing one or more resource pools of the user;
    extracting resource pool data associated with the one or more resource pools of the user;
    accessing one or more applications associated with the user; and
    extracting application data associated with the user.

15. The computerized method of claim 13, wherein transmitting the extracted information associated with the user to the at least one third party entity based on:
    prompting the user on a user device of the user to provide consent to transmit the information to the at least one third party entity; and
    receiving the consent from the user.

16. The computerized method of claim 13, wherein the method further comprises:
    calculating a resource limit associated with the at least one priority; and
    transmitting the resource limit to the at least one third party entity.

17. The computerized method of claim 13, wherein the method further comprises receiving the indication from a user device of the user.

18. The computerized method of claim 13, wherein identifying the one or more priorities associated with the user is based on at least one of:
    one or more conversations associated with an associate;
    one or more inputs received from the user; and
    one or more resource interactions associated with one or more resource pools of the user.

* * * * *